United States Patent [19]

Hartmann et al.

[11] Patent Number: 4,869,105
[45] Date of Patent: Sep. 26, 1989

[54] INSTRUMENT CASING ASSEMBLY

[75] Inventors: Jorg Hartmann, Villnachern; Dieter Hoffmann, Buchs, both of Switzerland

[73] Assignee: Kern & Co. Ltd., Aarau, Switzerland

[21] Appl. No.: 236,007

[22] Filed: Aug. 22, 1988

[30] Foreign Application Priority Data

Aug. 21, 1987 [CH] Switzerland ............... 3223/87

[51] Int. Cl.$^4$ ............................................. G01D 11/24
[52] U.S. Cl. .............................................. 73/431
[58] Field of Search ............................................ 73/431

[56] References Cited

U.S. PATENT DOCUMENTS

| | | |
|---|---|---|
| 4,092,866 | 6/1978 | Miele, Jr. et al. ............... 73/431 |
| 4,322,835 | 3/1982 | Ernst et al. ............... 73/431 X |
| 4,445,374 | 5/1984 | Huret, deceased et al. ...... 73/431 X |
| 4,555,945 | 12/1985 | Hanson ............... 73/431 |
| 4,597,291 | 7/1986 | Motomiya ............... 73/431 X |
| 4,643,026 | 2/1987 | Betterton et al. ............... 73/431 |
| 4,753,112 | 6/1988 | Wetterhorn et al. ............... 73/431 |

Primary Examiner—Tom Noland
Attorney, Agent, or Firm—Burns, Doane, Swecker & Mathis

[57] ABSTRACT

The supporting body of an instrument is joined to a casing by means of ribs fitting into guideways angularly spaced around a centerline of the supporting body. Thereby, small clearances between the ribs and guideways in a direction parallel to the casing wall surfaces are effective in limiting play at right angles to the casing walls, where much greater clearances must be provided. The casing may expand or shrink freely without exerting strains on the supporting body that could interfere with the proper function of the instrument, due to the large radial clearances between the ribs and guideways.

8 Claims, 3 Drawing Sheets

INSTRUMENT CASING ASSEMBLY

BACKGROUND AND FIELD OF THE INVENTION

The present invention relates to an instrument casing assembly.

Known casings, e.g. casings made of plastics, which are fixedly joined to the carrier body of an instrument exert pressure or tension on that body if they shrink or expand due to changes in temperature, water absorption, after-shrinkage, etc. Such mechanical strain causes the instruments to change their shape which may result in alterations of measurement results obtained with these instruments.

One of the objects of the present invention is to provide an instrument casing assembly with a junction between the casing and the body of the instrument that will not cause mutual strains in case of dimensional variations of casing or body of the instrument.

SUMMARY OF THE INVENTION

According to one aspect of the invention, an instrument may comprise a body having guideways and a casing having ribs fitting into sad guideways with clearances such that no pressure is exerted between casing and instrument body even in case of enlargement or shrinkage.

According to another aspect of the invention an instrument may comprise a casing having guideways and a body having ribs fitting into said guideways with clearances such that no pressure is exerted between casing and instrument body even in case of enlargement or shrinkage.

The guideways also comprise at least three pairs of crossed grooves, and the ribs comprise corresponding crossed blades fitting into the crossed grooves with the required clearances.

These and other objects, advantages and features of the present invention will be apparent to one skilled in the pertinent art from the accompanying description of a preferred embodiment of the invention and the appended claims when considered in conjunction with the drawings.

DETAILED DESCRIPTION OF A PREFERRED EMBODIMENT

Figure 1:
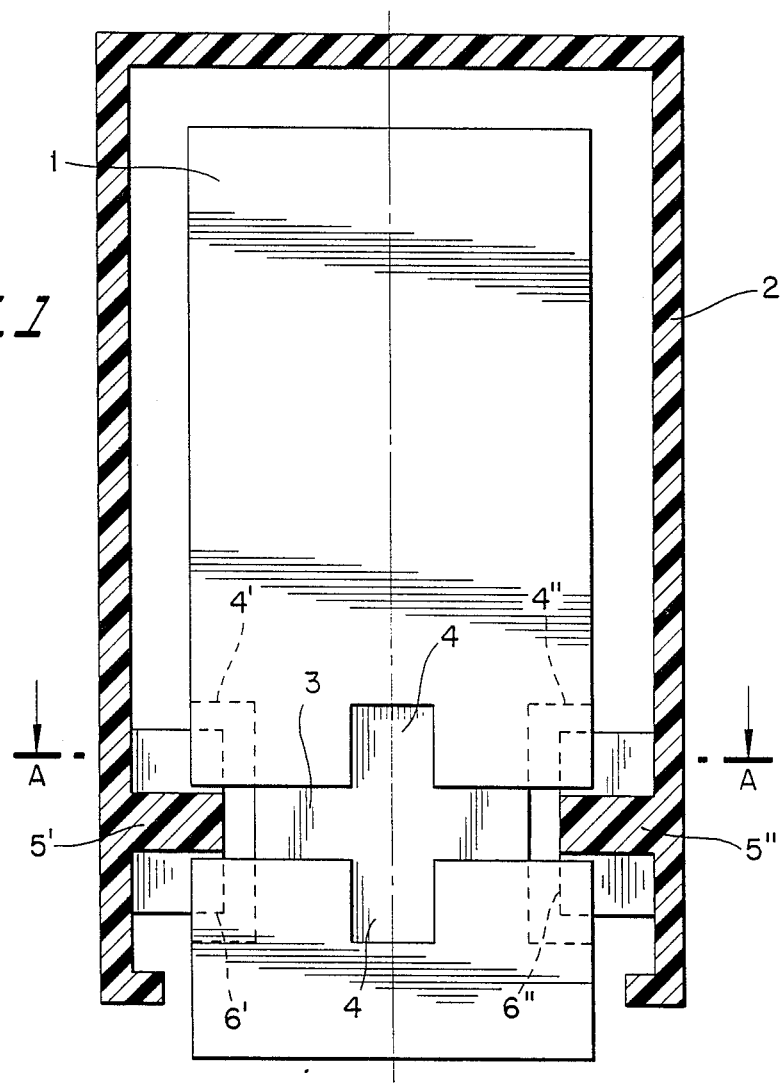
FIG. 1 is a side view of an instrument with a casing shown in sectional view.

FIG. 1 shows a instrument 1 formed like a column having a quadratic base and its corresponding plastic casing 2 in longitudinal section. For attachment of the casing 2, the instrument 1 has a groove 3 on each of its four sidewalls Each sidewall has also a traverse groove 4 to form a crossed groove with the groove 3. The traverse grooves on the left and right sidewalls are represented as broken lines 4' and 4" only.

Figure 2:
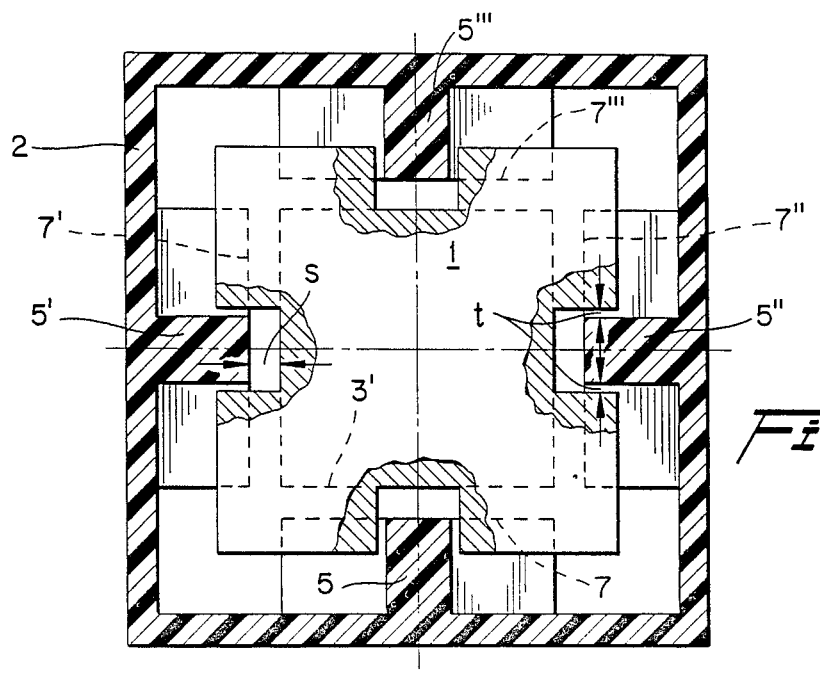
FIG. 2 is a top view of the instrument shown in FIG. 2 with the casing being shown as a cross section along the line A—A of FIG. 1.

The casing 2 has four crossed guiding blades 5, 5', 5" and 5'". In FIG. 1 only two crossed blades 5' and 5" are shown in transverse section. The top view of FIG. 2 shows all four crossed blades in section along the line A—A of FIG. 1. The crossed blades 5, 5' and 5" engage into the crossed grooves 4, 4' and 4". The vertical parts of the crossed blades 5', 5" are shown in FIG. 1 partly by broken lines 6', 6" where they are hidden by the instrument 1. The casing may be mounted to the instrument, e.g. if it consists of two or more parts. The blades are inserted into the grooves and the parts are snapped together by means of suitable joints.

The horizontal parts of the crossed blades 5, 5', 5" and 5'" are shown in FIG. 2 partly by broken lines 7, 7', 7" and 7'" where they are hidden by the instrument 1. The bottom of the groove 3 is shown in FIG. 2 by the broken line 3±.

As shown in FIGS. 1 and 2, clearances marked "s" are provided between the crossed blades 5 and the bottom 3' of the groove 3. These clearances are typically 0.5 millimeters in depths, and they are provided to prevent the crossed blades 5 from getting into contact with the instrument 1 in such a way as to exert pressure on the latter in case of shrinkage of casing 2. The overall clearance of the casing 2 with respect to the instrument 1 may, however, be kept much smaller than 0.5 millimeters, because a clearance "t" of typically only 0.05 millimeters is required between the crossed blades 5 and the sidewalls of the grooves 3 and 4 to avoid locking and a transfer of forces of the blades 5 within the grooves 3 and 4 in case of different expansions of these components.

Thus, the casing 2 is held on the instrument 1 only by the crossed blades 5, of which the horizontal parts 7 are resting on the lower sidewall of the groove 3. In case of different dimensional changes of the casing 2 and the instrument 1 due to changing temperature, water absorption, after-shrinkage etc. only the relatively large clearances "s" between the blades 5 and the bottom of the grooves 3 and 4 will vary, such variations occurring in such a way that no strains will be exerted on the instrument 1.

Figure 3:
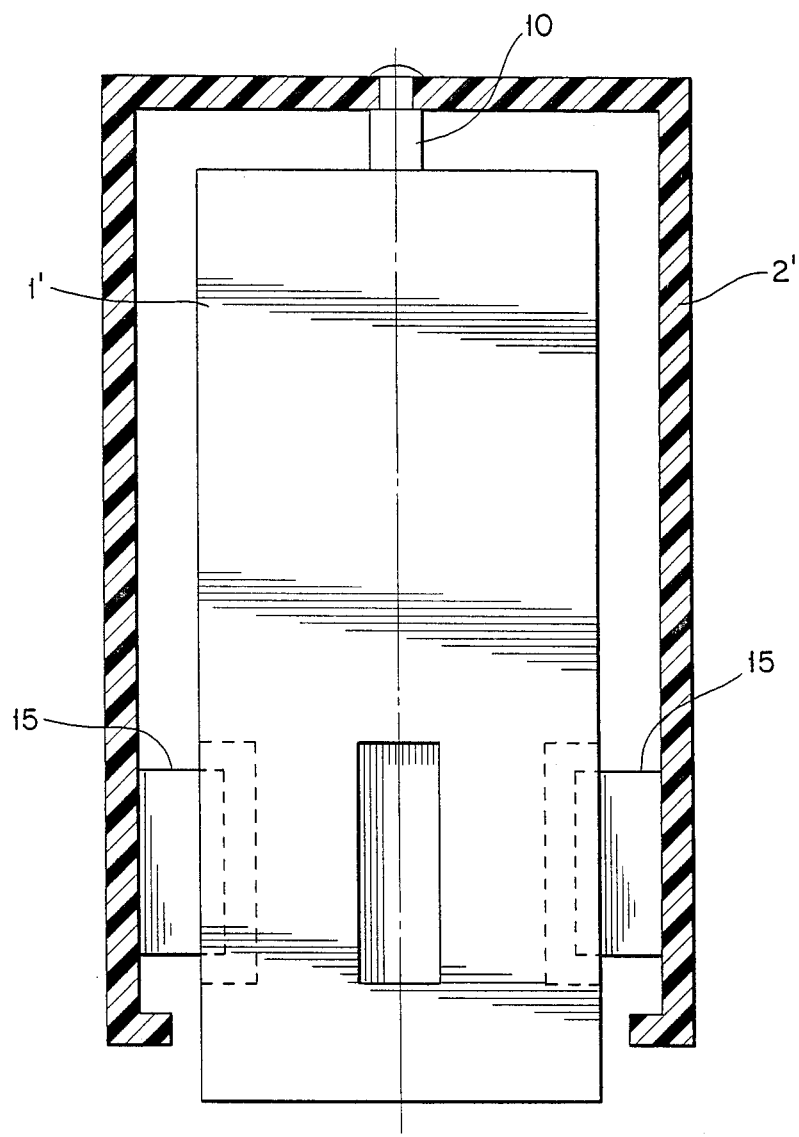
FIG. 3 is a side view of an instrument with a casing shown in sectional view and joined to the instrument body by one fixed junction.
Figure 4:
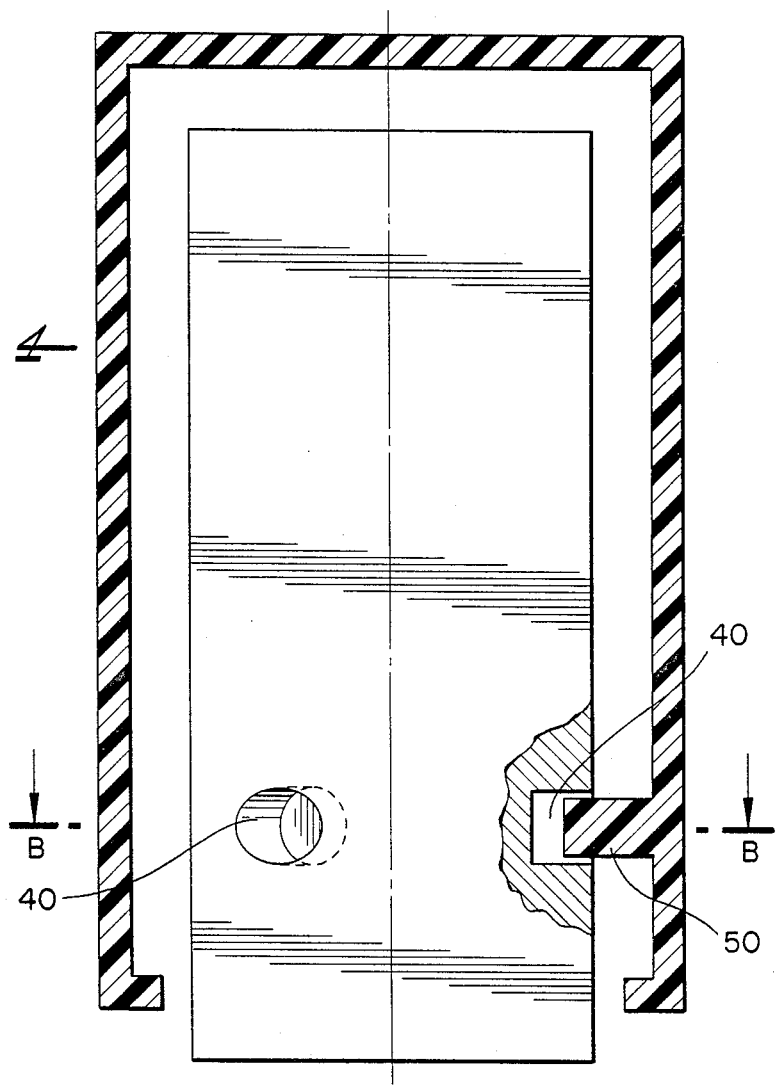
FIG. 4 is a side view of an instrument with a casing shown in sectional view and joined to the instrument body by pins fitting into bore of the body.
Figure 5:
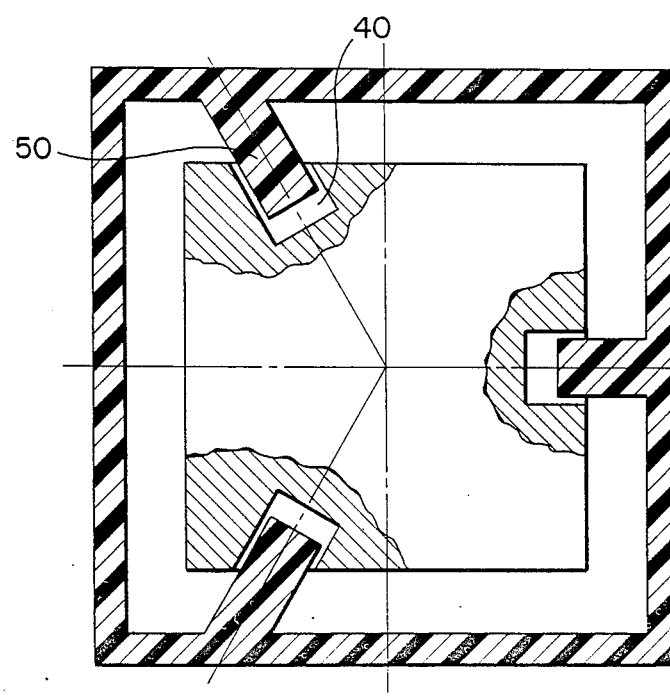
FIG. 5 is a top view of the instrument shown in FIG. 4 with the casing being shown as a cross section along the line B—B of FIG. 4.

The present invention is not limited in scope to the above described preferred embodiment. There may be more or less than four ribs and guideways. The casing may be definitely kept in place by as little as three bearing points. If one fixed joint 10 between the casing 2' and the body of the instrument 1' shown in FIG. 3 is provided, e.g. at the center of the top of instrument 1', the crossed blades 5 are no longer needed to bear the casing 2. Only a lateral guidance of the casing 2' must be provided by the blades 15. Thus the horizontal blades 7 are no longer required. The guideways and the corresponding ribs may be of a rather simple shape. Merely bores 40 of sufficient depth and pins 50 fitting therein are needed for certain applications as shown in FIGS. 4 and 5. In case of different dimensional changes the pins 50 will extend more or less far down into the bores 40.

What is claimed is:

1. An instrument casing assembly comprising an instrument body and a casing, one of said body and casing having at least three recesses therein angularly spaced around a centerline and the other having prominences fitting into said recesses with clearances such that no pressure is exerted between the casing and the instrument body even in case of enlargement or shrinkage.

2. An instrument casing assembly according to claim 1 wherein said instrument body has said recesses and said casing has said prominences.

3. An instrument casing assembly according to claim 1, wherein said casing has said recesses and said casing has said prominences.

4. An instrument casing assembly according to claim 1, wherein said instrument body and said casing are joined together by at least one fixed junction.

5. An instrument casing assembly according to claim 1 wherein said casing is made at least partially of plastic.

6. An instrument casing assembly according to claim 1, wherein said recesses comprise at least three pairs of crossed grooves and said prominences comprise corresponding crossed blades fitting into the crossed grooves with the required clearances.

7. An instrument casing assembly comprising an instrument body and a casing, one of said body and casing having guideways therein and the other having ribs fitting into said quideways with clearances such that no pressure is exerted between the casing and the instrument body even in case of enlargement or shrinkage, said guideways comprising at least three pairs of crossed grooves and said ribs comprising corresponding crossed blades fitting into the crossed grooves with the required clearances.

8. An instrument casing assembly according to claim 7 wherein said casing is made at least partially of plastic.

* * * * *